United States Patent [19]

Rowland et al.

[11] Patent Number: 5,391,411
[45] Date of Patent: Feb. 21, 1995

[54] GLAZING ASSEMBLIES AND METHOD

[75] Inventors: Eric Rowland, Ormskirk; Vincent Wilcock, St. Helens, both of United Kingdom

[73] Assignee: Pilkington PLC, United Kingdom

[21] Appl. No.: 14,494

[22] Filed: Feb. 8, 1993

[30] Foreign Application Priority Data

Feb. 13, 1992 [GB] United Kingdom ............... 9203044

[51] Int. Cl.⁶ .................. B32B 17/10; C03C 27/10
[52] U.S. Cl. ........................... 428/34; 428/210;
428/428; 428/441; 52/788; 52/790; 264/261;
156/102; 156/104
[58] Field of Search .............. 428/34, 210, 428, 441,
428/38; 52/788, 790, 789, 208; 264/261;
156/99, 109, 104, 256, 290, 293, 107

[56] References Cited

U.S. PATENT DOCUMENTS

| | | | |
|---|---|---|---|
| 2,125,372 | 8/1938 | Fox | 52/790 X |
| 2,359,163 | 9/1944 | Sherts | 156/99 X |
| 3,451,853 | 6/1969 | Spahrbier | 264/261 X |
| 3,679,527 | 7/1972 | Crick | 428/34 |
| 3,703,425 | 11/1972 | Delmonte et al. | 156/104 X |
| 4,046,933 | 9/1977 | Stefanik | 156/107 X |
| 4,081,581 | 3/1978 | Littell, Jr. | 428/34 X |
| 4,343,758 | 8/1982 | Goralnik | 264/261 X |
| 4,680,206 | 7/1987 | Yoxon et al. | 52/788 X |
| 4,756,938 | 7/1988 | Hickman | 428/38 |
| 4,893,443 | 1/1990 | Haber | 52/788 X |
| 4,912,898 | 4/1990 | Holmes | 52/790 X |
| 4,933,227 | 6/1990 | Stewart | 156/104 X |

Primary Examiner—Michael W. Ball
Assistant Examiner—Francis J. Lorin
Attorney, Agent, or Firm—Howrey & Simon

[57] ABSTRACT

A glass laminate assembly comprises two glass sheets 11,12 with an interlayer of cured resin 17 formed by a cast-in-place process. An aperture 15 for an attachment device 13 is formed in at least one of the glass sheets and a resilient adhesive sealing tape 16 is formed between the faces of the glass sheets 11 and 12 surrounding the hole 15.

9 Claims, 1 Drawing Sheet

GLAZING ASSEMBLIES AND METHOD

The present invention relates to glazing assemblies of the laminar type and to a method of making such assemblies.

BACKGROUND OF THE INVENTION

Known glazing structures or laminates employ a layer of PVB (Polyvinylbutyral) between, for example, two glass sheets. Such known laminates are produced by passing two heated glass sheets with the PVB therebetween through nip rollers and into an autoclave.

When there is a requirement to laminate glass sheets, particularly toughened glass sheets, which incorporate apertures or holes which are subsequently employed for locating attachment means to secure the laminate, several problems arise as follows:

(a) The need to use thick PVB to handle distortion and bow associated with use of rollers in forming toughened glass and to avoid entrapped air bubbles.

(b) The PVB melts around the holes and is subsequently difficult to clear.

(c) It is difficult to place inserts, e.g. attachment nuts, in the laminate.

(d) The glass sheets tend to move in relation to each other as they pass through the nip rollers making alignment of holes in adjacent glass sheets extremely difficult to achieve.

It has been found that some of these problems can be reduced by using known so-called cast-in-place laminating techniques.

The cast-in-place technique involves making a thin glass cell, filling with a suitable liquid resin material and curing that resin to form a laminate. This is achieved by applying a peripheral seal around the edge of one glass sheet which also acts as a spacer and placing the second glass sheet over the first to produce a cell and pouring liquid resin between the two glass sheets. The edge seal is typically butyl or foam tape.

The space is filled usually from the top while the glass sheets are held at an angle and the hydrostatic pressure pushes the glass sheets apart making them bow outwardly slightly, thus more liquid, normally about 15%, can be poured between the glasses to allow for shrinkage during the curing stage.

During this filling process the edges of the glass sheets are clamped to prevent them from separating under the hydrostatic pressure and to prevent liquid resin escape at the edges of the glass sheets.

When the required volume of liquid resin has been poured into the cell, the cell is brought into the horizontal so that all the air between the glass sheets is forced out and the air space totally filled with the liquid resin. The resin is then cured by, for example, exothermic catalytic reaction or UV initiated means. The unsightly edge seal can be cut off if the glass sheets are annealed.

However, to laminate glass sheets, particularly those of the toughened type, incorporating apertures or holes using the cast-in-place technique, a major difficulty encountered is to prevent liquid resin loss from the space between the glass sheets in the region around the apertures or holes during the liquid resin filling and curing stages.

SUMMARY OF THE INVENTION

An aim of this invention is to overcome the beforementioned difficulties encountered in PVB laminates and in cast-in-place laminates employing glass sheets incorporating apertures, in a simple, efficient and inexpensive manner.

According to this invention there is provided a glazing assembly comprising at least two separate sheets of glass at least one of which incorporates at least one aperture for the location of attachment means and the sheets of glass are arranged face-to-face in close substantially parallel spaced-apart relationship by means of a peripheral spacing means creating a space between the inner faces of the sheets of glass, wherein a peripheral resilient sealing means is located around the or each aperture between the opposing inner faces of the two sheets of glass and the sealing means serves to prevent a liquid resin material introduced into the space between the glass sheets from escaping into the aperture during filling of the space with the liquid resin material and also during the curing of the liquid resin material.

Preferably the resilient sealing means expands during filling and contracts during curing.

According to this invention there is also provided a method of sealing around the periphery of an aperture or apertures in a glass sheet or sheets during a cast-in-place process for laminating two or more spaced-apart glass sheets together by positioning a resilient sealing means in a space between the inner faces of the glass sheets around the periphery of the aperture or apertures to maintain a seal during filling of a space between the glass sheet or sheets with a liquid resin material and also during the curing of the liquid resin material.

Preferably the sealing means expands during filling and contracts during curing.

DESCRIPTION OF THE PREFERRED EMBODIMENTS

Figure 1:
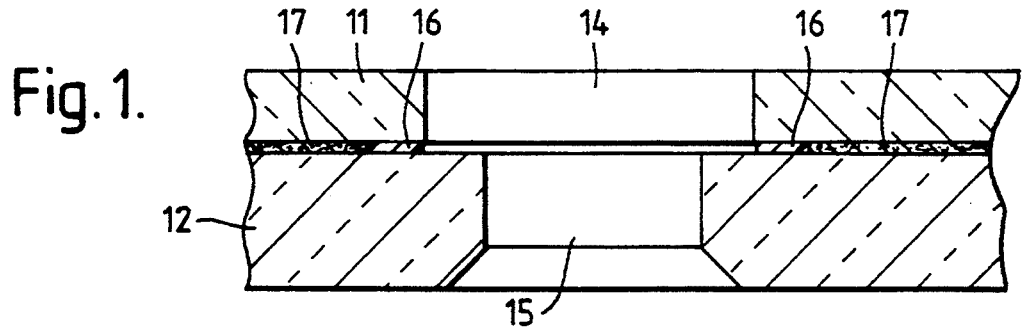
FIG. 1 illustrate a sectional side elevation of a pair of glass sheets, both of which incorporate an aperture, and which are laminated in accordance with this invention.
Figure 3:
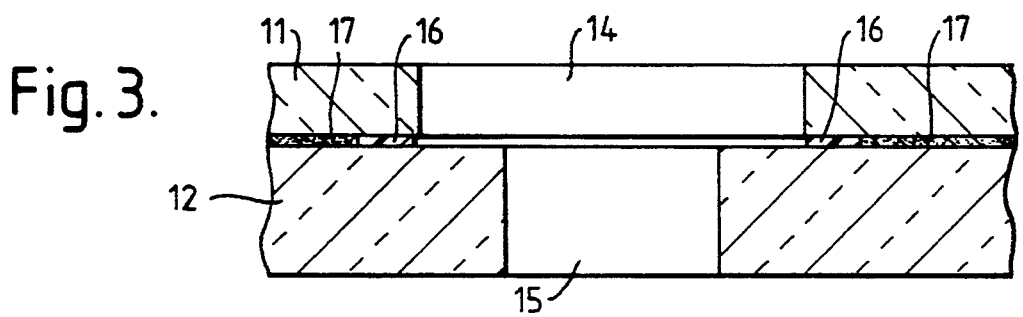

Referring to the drawings, it should be understood that these examples relate to three basic laminated glass products as follows:

1. Laminating two glass sheets 11 and 12 with holes 14 and 15, in both glass sheets 11 and 12, of different size which need to be accurately aligned (see FIG. 1 and FIG. 3).

Figure 2:
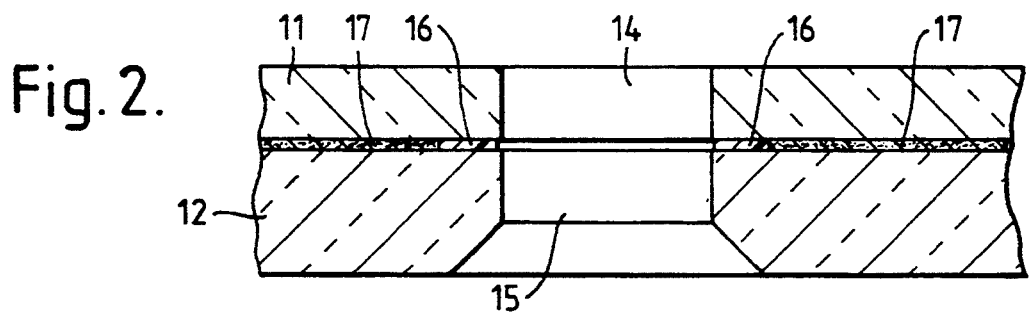
FIG. 2, FIG. 3 and FIG. 5 illustrate similar embodiments to that shown in FIG. 1 with both glass sheets incorporating adjacent apertures and which are laminated in accordance with this invention.
Figure 5:
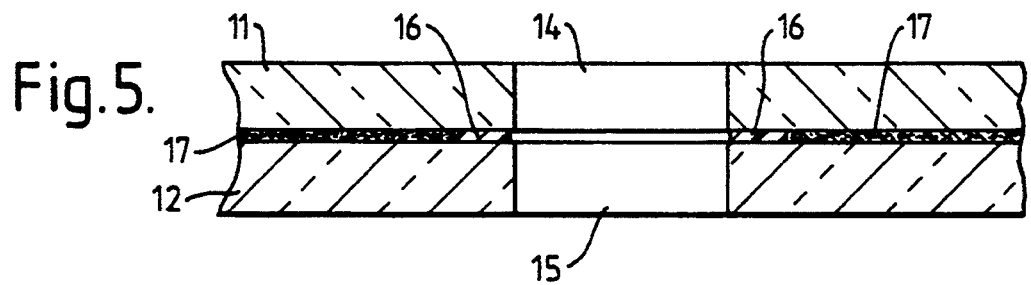

2. Laminating two glass sheets 11 and 12, with holes 14 and 15 of equal size at their interface in both glass sheets 11 and 12 which need to be accurately aligned (see FIG. 2 and FIG. 5 ).

3. Laminating two glass sheets 11 and 12 with a hole 15 in one glass sheet 12 only with an attachment insert 13 in the hole.

However, it will be appreciated that several alternative combinations of the above are easily implemented. For instance, (a) multilaminates with any combination of 1, 2 and 3 as mentioned above, (b) all of the above with several and varied hole arrangements in the glass sheets.

Suitable glass thicknesses can range from 3 mm to 25 mm with a typical combination being 4 mm and 10 mm. The glass types may be, typically, toughened glass for the thicker dimensioned glass and either toughened or heat strengthened for the thinner dimensioned glass.

The examples use cast-in-place techniques and solve the problems of liquid resin material escape from around the region of the apertures in the glass sheet or sheets by positioning a double-sided adhesive clear tape 16, which is preferably a resilient acrylic transfer adhesive (nominally 1 mm or 2 mm in thickness, and which is available from the Company 3Ms) in the region around the apertures 14,15 in the space between the two glass sheets 11,12 to serve as an annular seal (see FIG. 1 to FIG. 5).

It has been found that when the glass sheets 11,12 separate during the liquid filling stage, the adhesive seal 16 expands and maintains the seal under the developed hydrostatic pressure. Further, when the glass assembly is laid in the horizontal, it has been found that the adhesive seal 16 contracts and returns to its original thickness to maintain effective sealing during the curing stage and thereby leave a clean neat edge around the periphery of the hole in the finished laminate.

Apart from the advantage of maintaining an effective sealing at all times during the cast-in-place process, the seal itself is practically invisible in the finished laminate.

A further advantage is that because the glass sheets 11,12 are firmly clamped at the periphery there is no possibility of oppositely positioned holes 14,15 in adjacent sheets 11,12 becoming misaligned in the laminating process.

The method of constructing a glazing assembly or laminate including such a resilient seal around the region of the apertures involving the following steps:

1. Placing a narrow sealing means (preferably a clear resilient and adhesive polymer tape such as double-sided adhesive acrylic tape available from the Company 3Ms) on one face of a first suitable glass sheet towards the edge thereof around the periphery of one glass sheet 11 or 12 but leaving a short gap, e.g. one inch in length, between the ends of the tape.

2. Placing a resilient sealing means in the form of the tape 16 (as used in step 1) on the face of the sheet around the periphery of the holes or apertures 14 or 15 in the one glass sheet 11 or 12.

3. Placing a second glass sheet 11 or 12 in alignment and face-to-face in a substantially parallel relationship with the first glass sheet and clamping the two glass sheets 11 and 12 together around the periphery thereof so that the narrow peripheral sealing means serves as a spacer enabling a space to be defined between the two inner faces of the glass sheets 11 and 12, a channel also being created in the gap between the ends of the tape for filling and venting. Alternatively a gap may be provided between the peripheral tape and one of the glass sheets for this purpose. The tape 16 around the holes 14,15 serves as a seal.

4. Placing the two clamped spaced-apart glass sheets 11 and 12 at an angle with respect to the horizontal (about 35°) and introducing a predetermined quantity of liquid resin material (preferably an acrylic resin available from the Company Chemetal) into the channel or gap and filling the space between the two glass sheets 11 and 12 causing the glass sheets to bow under hydrostatic pressure.

5. Placing the glass sheets 11 and 12 in the horizontal and permitting air to escape from the space between the glass sheets by way of the channel or gap until the glass sheets return to their near original substantially parallel relationship and sealing the channel or gap.

6. Allowing the liquid resin material to cure by, for example, either exothermic catalytic reaction or UV initiated means, to provide a layer 17 of cured resin between the sheets 11 and 12.

Figure 4:
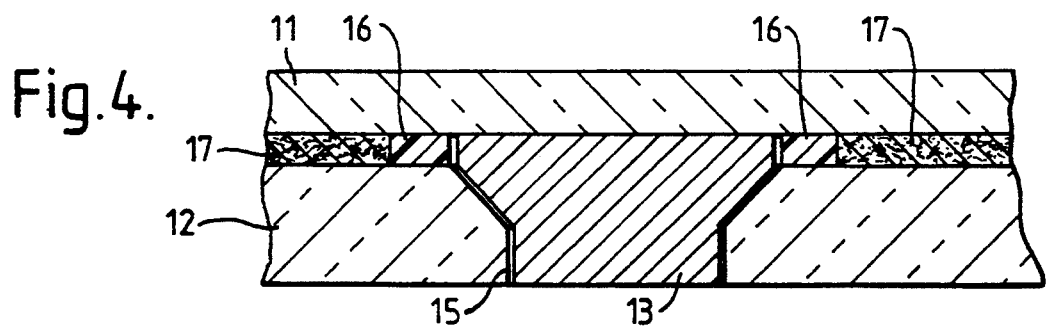
FIG. 4 illustrates a further embodiment similar to that shown in FIG. 1 but with only one aperture incorporating an attachment insert.

The above sequence of steps may be used to form any of the glass assemblies shown in FIGS. 1 to 5. In the case of FIG. 4 the attachment insert 13 is located in the hole 15 before the upper sheet 11 is placed in over the lower sheet 12.

It will be understood that the holes 14 or 15 in the above examples may be circular in shape and in this case the resilient tape 16 may form an annular ring around the holes or around the larger of the two holes when they are of different size. The ring of tape 16 may be formed as a closed continuous annular ring of tape with no join. By locating the ring of tape 16 against the faces of the two sheets around the periphery of the hole, the tape does not project into the hole and it provides a seal against leakage of liquid resin reaching the holes 14 and 15. It thereby avoids the need to clear resin from the hole after curing which could be necessary if a seal was located within the holes themselves.

Although the above examples use a clear resilient acrylic tape 16, other resilient adhesive sealing tapes may be used.

We claim:

1. A cast-in-place laminated glazing assembly including at least first and second separate sheets of glass at least one of which first and second sheets incorporates at least one aperture for the location of attachment means and the first and second sheets of glass are arranged face-to-face in close substantially parallel spaced-apart relationship by means of a peripheral spacing means and an interlayer of cured resin material between the inner faces of the first and second sheets of glass, wherein resilient sealing tape is located around the or each aperture between the opposing inner faces of the first and second sheets of glass spaced inwardly from said peripheral spacing means and the sealing tape serves to prevent resin material escaping into the or each aperture prior to curing of the resin material.

2. A cast-in-place laminated glazing assembly according to claim 1 in which said sealing tape is in the form of a continuous ring.

3. A cast-in-place laminated glazing assembly according to claim 1 in which said sealing tape is formed of a clear resilient adhesive polymer tape.

4. A method of forming a laminated glass assembly by a cast-in-place process in which two sheets of glass are arranged face-to-face in close substantially parallel spaced apart relationship with a peripheral seal, thereby providing a space between the inner faces of the sheets, introducing liquid resin material into said space and curing the liquid resin to form a laminate resin layer between said sheets, wherein at least one of said sheets is formed with an aperture spaced from the periphery of the sheet and prior to introducing liquid resin between the sheets a seal is formed between the sheets surrounding said aperture by insertion of a resilient adhesive sealing tape member around the aperture wherein the seal prevents the resin material from escaping into the aperture prior to curing of the resin material.

5. A method according to claim 4 in which said tape comprises a resilient clear transparent tape.

6. A method according to claim 4 in which the sealing tape member around the aperture comprises a continuous annular ring.

7. A method according to claim 5 in which said sealing tape member around the aperture comprises a resilient adhesive acrylics polymer tape.

8. A method according to claim 5 in which the sealing tape member around said aperture expands during filling of the space between the glass sheets with liquid resin material and contracts during curing of the resin material thereby maintaining the seal between the glass sheets during the filling and curing operations.

9. A method according to claim 4 in which at least one of the glass sheets comprises toughened glass.

* * * * *